United States Patent
De Meester et al.

(10) Patent No.: US 6,783,473 B2
(45) Date of Patent: Aug. 31, 2004

(54) BELT INSTALLATION TOOL

(75) Inventors: Marc De Meester, Flanders (BE); Adelbrecht Vanheusden, Erembodegem (BE); Kamiel Slagmulder, Lede (BE)

(73) Assignee: The Gate Corporation, Denver, CO (US)

( * ) Notice: Subject to any disclaimer, the term of this patent is extended or adjusted under 35 U.S.C. 154(b) by 90 days.

(21) Appl. No.: 10/256,851

(22) Filed: Sep. 26, 2002

(65) Prior Publication Data

US 2004/0063530 A1 Apr. 1, 2004

(51) Int. Cl.[7] ................................................. F16H 7/22
(52) U.S. Cl. ...................................................... 474/130
(58) Field of Search ......................................... 474/130

(56) References Cited

U.S. PATENT DOCUMENTS

| | | | |
|---|---|---|---|
| 478,260 A | 7/1892 | Hammesfahr | 474/130 |
| 490,546 A | 1/1893 | Donkin | 474/130 |
| 654,052 A | 7/1900 | Cliff et al. | 474/130 |
| 680,063 A | 8/1901 | Montgomery | 474/130 |
| 720,566 A | 2/1903 | Coulter | 474/130 |
| 1,169,565 A | 1/1916 | Pepper | 474/130 |
| 1,651,063 A | 11/1927 | Keller | 474/130 |
| 6,402,649 B1 * | 6/2002 | Amkreutz | 474/130 |
| 2003/0176248 A1 * | 9/2003 | De Meester et al. | 474/130 |
| 2003/0211910 A1 * | 11/2003 | Gerring et al. | 474/130 |

* cited by examiner

Primary Examiner—Thomas R. Hannon
(74) Attorney, Agent, or Firm—J. A. Thurnau, Esq.; C. H. Castleman, Esq.; S. G. Austin, Esq.

(57) ABSTRACT

The invention comprises a belt installation tool comprising a substantially planar body. A belt engaging surface extends substantially normally from a portion of the planar body. A pulley engaging portion extends from the planar body approximately opposite the belt engaging surface. A central bore allows a tool to engage a pulley shaft. In use, the pulley engaging surface engages a pulley whereby the tool is rotated by a pulley rotation about a pulley axis, thereby causing the belt engaging surface to automatically urge a belt onto a pulley. The planar body stabilizes the tool against the pulley as a belt is installed. The molded body may be fabricated by injection molding.

11 Claims, 2 Drawing Sheets

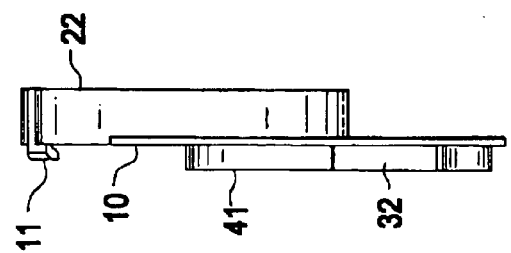
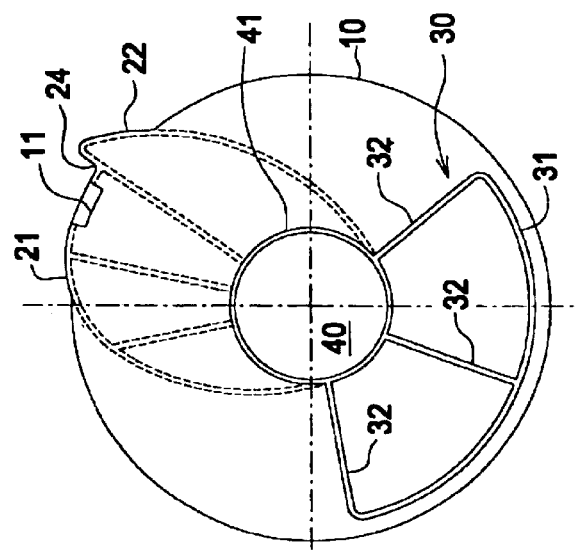
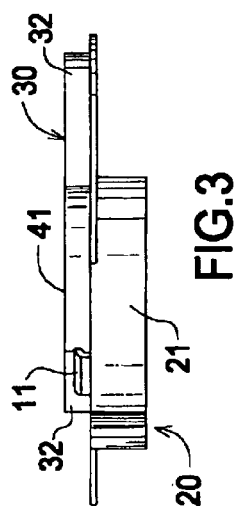
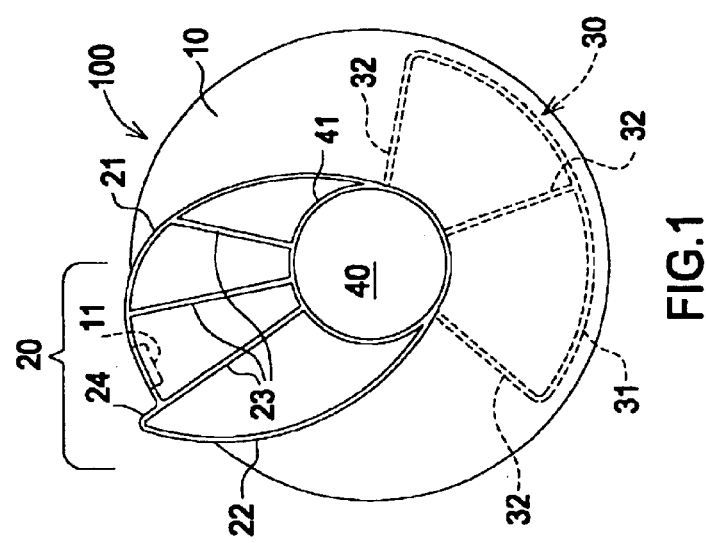

BELT INSTALLATION TOOL

FIELD OF THE INVENTION

The invention relates to a belt installation tool, and more particularly to a belt installation tool comprising a molded body having an arcuate surface normal to a planar surface for installing a belt.

BACKGROUND OF THE INVENTION

Belt drive systems generally comprise a belt entrained about two or more pulleys. In order to properly transmit a torque or power from a driven pulley to a driver pulley, a belt must be installed with a predetermined tension. This can be accomplished in one of several ways. One method consists of adjusting a pulley center; first to engage a slack belt, and then by moving the pulley center to apply a tension.

Another method comprises wrapping a belt about a pulley rim without moving a pulley center. This method can be accomplished using a tool for engaging a belt with a pulley. Prior art tools are available that provide a surface for urging a belt into a pulley groove.

Representative of the art is U.S. Pat. No. 6,033,331 to Winninger (2000) which discloses a tool for installing a stretch belt on a pulley.

What is needed is a belt installation tool comprising a molded body having a tool access portion extending opposite to a belt engaging portion. What is needed is a belt installation tool comprising a molded body having an arcuate belt engaging surface normal to a planar surface. What is needed is a belt installation tool having a lightweight planar body. The present invention meets these needs.

SUMMARY OF THE INVENTION

The primary aspect of the invention is to provide a belt installation tool comprising a molded body having a tool access portion extending opposite to a belt engaging portion.

Another aspect of the invention is to provide a belt installation tool comprising a molded body having an arcuate belt engaging surface normal to a planar surface.

Another aspect of the invention is to provide a belt installation tool having a lightweight planar body.

Other aspects of the invention will be pointed out or made obvious by the following description of the invention and the accompanying drawings.

The invention comprises a belt installation tool comprising a substantially planar body. A belt engaging surface extends substantially normally from a portion of the planar body. A pulley engaging portion extends from the planar body approximately opposite the belt engaging surface. A central bore allows a tool to engage a pulley shaft. In use, the pulley engaging surface engages a pulley whereby the tool is rotated by a pulley rotation about a pulley axis, thereby causing the belt engaging surface to automatically urge a belt onto a pulley. The planar body stabilizes the tool against the pulley as a belt is installed. The molded body may be fabricated by injection molding.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is a plan view of the inventive tool.

FIG. 2 is a plan view of the tool opposite the side shown in FIG. 1.

FIG. 3 is a side view of the tool.

FIG. 4 is a side view of the tool.

DETAILED DESCRIPTION OF THE PREFERRED EMBODIMENT

Figure 5:
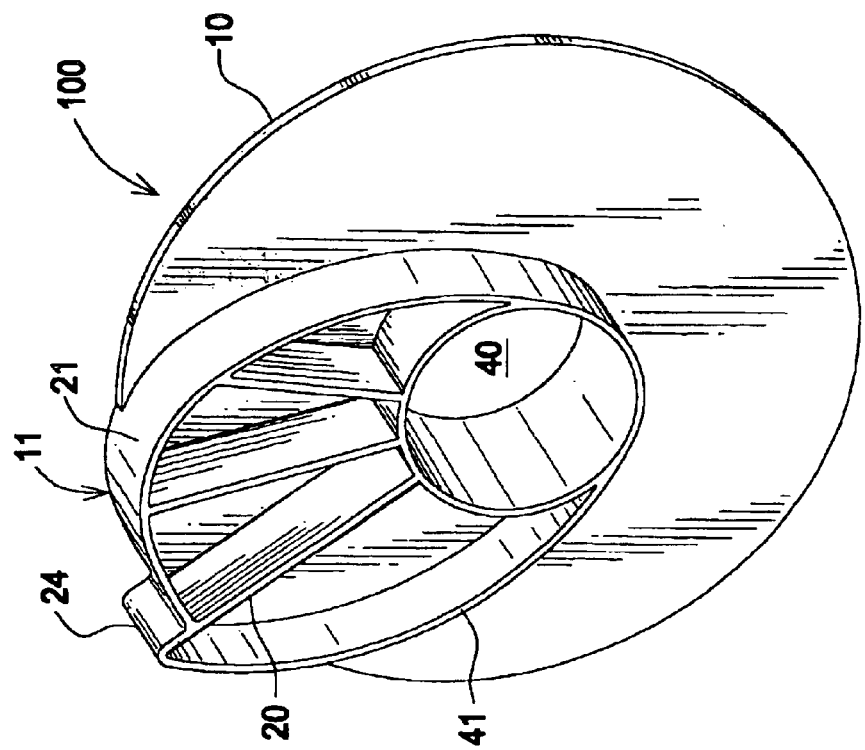
FIG. 5 is a front perspective view of the tool.

FIG. 1 is a plan view of the inventive tool. Tool 100 comprises a planar body 10. Planar body 10 is substantially circular.

Tool 100 further comprises belt urging portion 20 and pulley engaging portion 30. The tool also comprises bore 40 for allowing a tool (not shown) such as a wrench to engage a pulley shaft (not shown).

Belt urging portion 20 comprises a belt engaging surface 21. Surface 21 is connected to and extends substantially normally from planar body 10. Surface 21 is reinforced by ribs 23 which extend from rim 41. Use of ribs 23 reduces the material requirements for the inventive tool while providing the necessary strength to the belt engaging surface 21. Surface 21 describes a substantially arcuate shape to optimize a belt engagement during a belt installation.

Belt urging projection 24 extends from belt engaging surface 21. Belt urging projection 24 is connected to and reinforced by a rib 22 which extends in an arcuate form from belt urging projection 24 to rim 41. Ribs 23 reduce a material requirement for the inventive tool while reinforcing belt urging projection 24.

Pulley engaging portion 30 extends from a planar body surface that is on a side of planar body 10 opposite belt urging portion 20. Pulley engaging portion 30 comprises a rim 31 connected in a substantially normal position to planar body 10. Ribs 32 reinforce rim 31 and extend from rim 41 to rim 31. Rim 31 has a substantially circular shape that is concentric with bore 40.

The inventive tool may comprise any light-weight metallic or non-metallic, moldable material such as known polymers or plastics and their equivalents.

FIG. 2 is a plan view of the tool opposite the side shown in FIG. 1. Lip 11 extends from surface 21 to engage a pulley rim (not shown). Lip 11 is disposed in proximity to belt urging projection 24 to facilitate a belt installation. Lip 11 engages a pulley rim (not shown) to temporarily attach the tool to a pulley as a belt is installed.

FIG. 3 is a side view of the tool. Shown are ribs 32, planar body 10 and belt engaging surface 21. Lip 11 extends to engage a pulley rim (not shown).

FIG. 4 is a side view of the tool. Planar body 10 has a thickness sufficient to perform its intended function without adding unnecessary material. As such, the inventive tool is beneficially used in applications where space is at a premium, for example, on a front end accessory drive (FEAD) for an automobile engine. The FEAD and engine may have minimal space in an engine compartment, as such a tool allowing installation in a small space facilitates the successful design and use of such an engine compartment.

FIG. 5 is a front perspective view of the tool.

Figure 6:
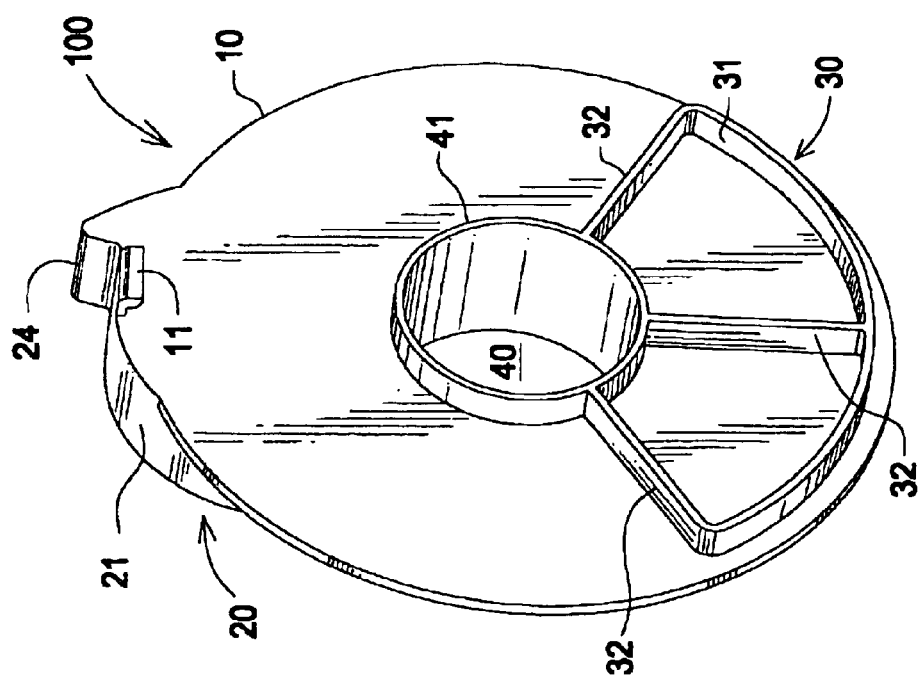
FIG. 6 is a back perspective view of the tool.

FIG. 6 is a back perspective view of the tool. Tab 11 engages a pulley rim in order to stabilize the tool during use. In use, pulley engaging portion 30 engages a pulley body (not shown), thereby causing the tool to rotate with a pulley as a belt is installed.

Although a single embodiment of the invention has been described herein, it will be obvious to those skilled in the art that variations may be made in the construction and relation of parts without departing from the spirit and scope of the invention described herein. Further, the description contained herein is exemplary only and the scope of the invention is to be limited only to the claims as interpreted in view of the prior art.

We claim:

1. A tool comprising:
   a planar body having a first body surface and second body surface;
   a belt engaging portion projecting substantially normally from the first body surface; and
   a pulley engaging portion projecting substantially normally from the second body surface.

2. The tool as in claim 1 further describing a central bore.

3. The tool as in claim 2 further comprising a rim about an edge of the central bore.

4. The tool as in claim 1, wherein the belt engaging portion further comprises a surface describing a substantially arcuate form.

5. The tool as in claim 4 further comprising a projection extending radially with respect to a central bore for urging a belt into a pulley groove.

6. The tool as in claim 5, wherein the pulley engaging portion further comprises an arcuate surface.

7. The tool as in claim 5 comprising a non-metallic material.

8. The tool as in claim 5 comprising a metallic material.

9. The tool as in claim 5 further comprising members to reinforce the belt engaging portion.

10. The tool as in claim 5, wherein the planar body is substantially circular.

11. The tool as in claim 5 further comprising a lip extending substantially normal to the planar body, the lip engageable with a pulley rim.

* * * * *